US010251373B2

(12) United States Patent
Loo et al.

(10) Patent No.: US 10,251,373 B2
(45) Date of Patent: Apr. 9, 2019

(54) POULTRY FEEDER

(71) Applicant: The GSI Group, LLC, Assumption, IL (US)

(72) Inventors: Soak Kian Loo, Penang (MY); Zuber Bin Mohamad, Bukit Mertajam (MY); Ching Chua Teh, Perai (MY); Bak Yan Goh, Penang (MY)

(73) Assignee: The GSI Group LLC, Assumption, IL (US)

( * ) Notice: Subject to any disclaimer, the term of this patent is extended or adjusted under 35 U.S.C. 154(b) by 0 days.

(21) Appl. No.: 16/066,925

(22) PCT Filed: Dec. 22, 2016

(86) PCT No.: PCT/US2016/068247
§ 371 (c)(1),
(2) Date: Jun. 28, 2018

(87) PCT Pub. No.: WO2017/116964
PCT Pub. Date: Jul. 6, 2017

(65) Prior Publication Data
US 2019/0014751 A1    Jan. 17, 2019

Related U.S. Application Data

(60) Provisional application No. 62/273,270, filed on Dec. 30, 2015.

(51) Int. Cl.
*A01K 39/01*    (2006.01)
*A01K 39/012*    (2006.01)

(52) U.S. Cl.
CPC .............................. *A01K 39/0125* (2013.01)

(58) Field of Classification Search
CPC ........................... A01K 39/01; A01K 39/0125
See application file for complete search history.

(56) References Cited

U.S. PATENT DOCUMENTS

| | | | | | |
|---|---|---|---|---|---|
| 5,275,131 | A | * | 1/1994 | Brake | A01K 39/0125 119/52.4 |
| 5,875,733 | A | * | 3/1999 | Chen | A01K 39/0125 119/53 |
| 5,884,581 | A | * | 3/1999 | Vandaele | A01K 39/0125 119/52.4 |

(Continued)

FOREIGN PATENT DOCUMENTS

WO    2015/175940 A1    11/2015

OTHER PUBLICATIONS

European Patent Office, International Search Report for related International Application No. PCT/US2016/068247, dated Apr. 11, 2017.

*Primary Examiner* — Justin M Benedik

(57) ABSTRACT

A poultry feeder operable in a winch-up condition where the feeder is positioned off of a floor of the poultry house and in a winch-down condition in which the feeder is position resting on the floor of the poultry house. The poultry feeder defines a first path and a second path for feed to enter the pan, the first path comprising a flood path through the aligned windows in lower drop tube portion and in the feed level skirt, and the second path comprising a path through the aligned spaces between the feed pan and the lower skirt of the feed level skirt and lower tube portion of the drop tube.

17 Claims, 12 Drawing Sheets

(56) References Cited

U.S. PATENT DOCUMENTS

| | | | | |
|---|---|---|---|---|
| 5,957,083 A | * | 9/1999 | Cheng | A01K 39/0125 119/53 |
| 6,050,220 A | * | 4/2000 | Kimmel | A01K 39/0125 119/53 |
| 6,470,826 B2 | * | 10/2002 | Thuline | A01K 39/0125 119/52.4 |
| D625,886 S | * | 10/2010 | Ellard | D30/121 |
| 2005/0072365 A1 | * | 4/2005 | Busses | A01K 39/01 119/57.7 |
| 2013/0139758 A1 | * | 6/2013 | Steudler, Jr. | A01K 39/0125 119/53 |

* cited by examiner

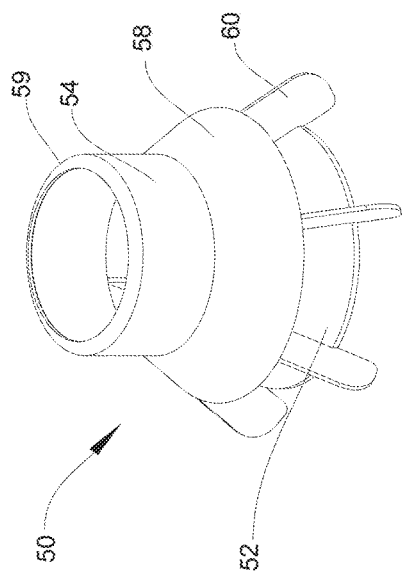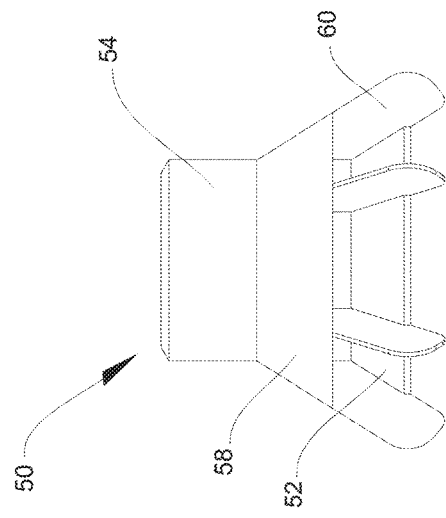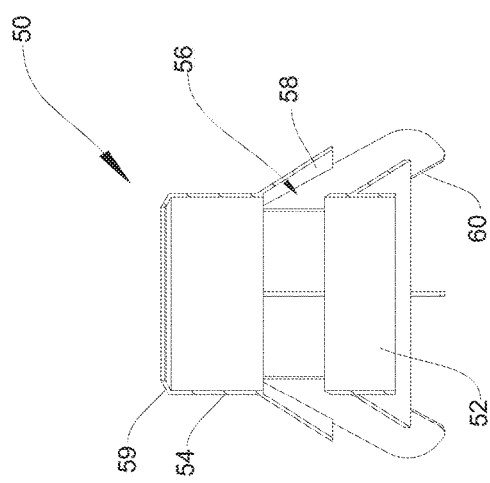

POULTRY FEEDER

CROSS REFERENCE TO RELATED APPLICATION

This application claims the benefit of U.S. Provisional Application No. 62/273,270 filed Dec. 30, 2015, which is hereby incorporated by reference in its entirety.

BACKGROUND OF THE INVENTION

Field of Invention

This disclosure relates to poultry feeders, and more particularly to poultry pan feeders offering multiple feed levels that can be readily set or adjusted.

Description of Related Art

In large poultry raising operations, the birds are typically housed in a long poultry house and are fed by a large number of feeders that are supplied with feed from a bulk feed tank outside of the poultry house where the feed is delivered to the feeders by a feed conveyor. The feeders and the conveyor may be raised clear of the floor by means of winch and cable system installed in the roof of the poultry house to allow for cleaning of the floor and the introduction of new bedding material. With new bedding material installed on the floor, the feeders are lowered to the floor and a new flock of young chicks is introduced into the poultry house.

Generally, there are at least two types of feeders now in use. One type of feeder has an adjustable height feed pan, such as the Hi-Lo® feeder available from the Cumberland division of The GSI Group, LLC of Assumption, Ill. Adjustable height feed pan feeders are shown, for example, in U.S. Pat. Nos. 5,311,839, 5,462,017, 5,718,187 and 7,647,888. In these last-mentioned feeders the feed pan has a relatively small amount of feed introduced into the feed pan. The initial height of the feed pan is relatively low so that the young chicks can see the feed and can readily access the feed. As the birds consume feed, the conveyor system can be actuated to add a small amount of feed to each of the feed pans. Because of a lost motion connection between the feeder and the pan, as the birds grow, the winch and cable system is operated to raise the feeders, which, in turn, increases the depth of the pan. The initially shallow depth feed pan allows the young birds to access the feed in the feed pan, and, because only a small amount of feed is deposited in the feed pan and because feed may be periodically added to the feeder, a steady supply of feed is maintained in the feed pan that will not go stale or be fouled before it is consumed. Then, as the birds grow, the feed pan depth can be increased while allowing the now larger birds to still access the feed and allowing more feed to be deposited in the feed pan without the birds raking feed from the feed pan. These adjustable depth feeders have resulted in shorter times from a flock to reach a desired market weight of the birds and in lower feed consumption.

The other type of feeder is known as a flood feeder in which a feed pan is flooded with feed for feeding young chicks. While this allows young birds to access the feed and to have a sufficient quantity of feed, such prior art flood feeders were typically not readily adjustable to offer different pre-set levels of feed for the birds. Reference may be made to U.S. Pat. Nos. 5,092,274, 6,173,676, 7,107,932, 7,228,697 and 7,552,697, which disclose prior art flood feeders in the same general field as the present disclosure.

BRIEF SUMMARY OF THE INVENTION

Briefly stated, a poultry feeder is disclosed that is configured to be installed on a feed conveyor. In accord with the feeder of the present disclosure, the feeder allows for the ready and easy adjustment of the amount of feed that is allowed to enter the feed pan so as to correspond to a plurality of predetermined feed levels.

Still further, the feeder of the present disclosure allows the feeder to be readily disassembled for cleaning and to be readily reassembled without the use of tools.

In one aspect, the invention is directed to a poultry feeder operable in a winch-up condition where the feeder is positioned off of a floor of the poultry house and in a winch-down condition in which the feeder is position resting on the floor of the poultry house. The poultry feeder includes a feed pan having a pan floor and a side wall and a grill having an annular wall which surrounds the pan side wall and is movable relative to the pan side wall between a first low-wall position in the winch-down condition in which the feeder has an effective lower wall height and a second high-wall position in the winch-up condition in which the feeder has an effective higher wall height. The grill further includes a plurality of spokes extending from a top of the annular wall and an upper ring connecting upper ends of said spokes. The poultry feeder includes a feed level skirt having a plurality of fins, a lower skirt and a feed level tube with at least one flood window in the feed level tube located above the lower skirt, and an upper rim having a diameter which is smaller than the diameter of the feed level tube. The fins contact the feed pan to position the feed level skirt in its operative position with a space formed between the feed pan and the lower skirt. The poultry feeder includes a drop tube having a lower drop tube portion, an upper drop tube portion having a diameter smaller than that of the lower drop tube portion, and a shoulder connecting the upper and lower drop tube portions. The lower drop tube portion has at least one flood window formed therein and feet on its bottom end that engage the feed pan so as to establish a space between the feed pan and the lower drop tube portion, the lower drop tube portion nesting within the feed level skirt with the upper drop tube portion extending through the upper rim, wherein the spaces between the feed pan and the feed lower skirt and lower drop tube portion align. The feed level skirt and drop tube are configured for vertical movement relative each other with the upper rim of the feed level skirt interacting with the shoulder to define one extreme of the vertical movement of the feed level skirt relative to the drop tube which is reached when the feeder is in the winch-up condition. In the winch-up condition, the at least one window of the feed level tube is out of alignment with the at least one window in the lower drop tube portion. When the feeder is in the winch-down condition, the feed level skirt moves upward relative the drop tube so the windows align such that feed may pass out of the drop tube through the aligned windows. The poultry feeder includes an adjustment ring having an upper surface and a snap hook extending down from the upper surface, the snap hook being insertable into the upper grill ring. The adjustment ring has internal threads on an inside surface thereof. The drop tube is received within the adjustment ring such that the internal threads on the adjustment ring threadably engage the threads on the drop tube so that by rotating the adjustment ring, the vertical position of the drop tube relative to the feed level skirt and the pan is changed to change a magnitude of the space between the drop tube and the pan and change a height of the at least one window in the drop tube.

In one aspect of the invention, the poultry feeder defines a first path and a second path for feed to enter the pan, the first path having a flood path through the aligned windows in lower drop tube portion and in the feed level skirt, and the second path having a path through the aligned spaces between the feed pan and the lower skirt of the feed level skirt and lower tube portion of the drop tube.

In one aspect of the invention, the poultry feeder is configured such that the windows are always aligned when in the winch-down condition such that there are always two flow paths in the winch-down condition. The poultry feeder is configured such that in the winch-up condition, the windows are out of alignment blocking the first flow path such that feed only flows through the second flow path.

In one aspect of the invention, the poultry feeder is such that the pan moves downward relative the grill into the high-wall pan position such that the feed level skirt moves downward relative to the drop tube until the top rim of the feed level skirt rests on the shoulder of the drop tube where the feed level tube blocks the at least one window in the lower drop tube portion.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIGS. 6A, 6B and 6C are perspective views of a feed level skirt for the feeder on an enlarged scale.

Corresponding reference characters indicate corresponding parts throughout the several views of the drawings.

DESCRIPTION OF PREFERRED EMBODIMENTS

Figure 1:
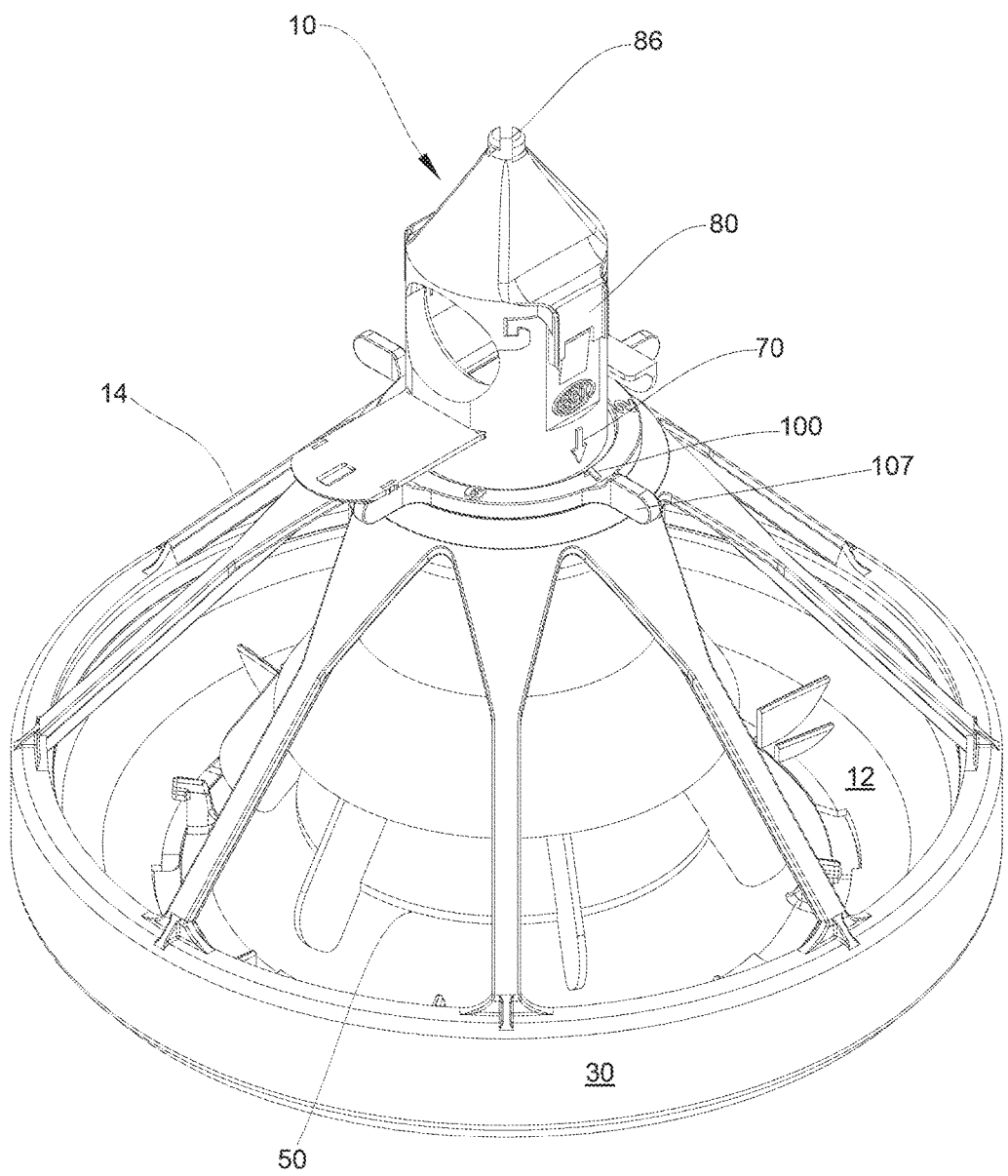
FIG. 1 is a perspective view of the feeder of the present disclosure.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Referring initially to FIG. 1 of the drawings, a poultry feeder, such as a broiler pan feeder, is illustrated generally by reference character 10. By way of background and as would be understood by one skilled in the art, several feeders 10 of the type illustrated in FIG. 1 are used together with a feed conveyor (not shown) in a poultry house (also not shown) to deliver feed that is typically stored in a bulk feed tank (also not shown) located outside of the poultry house in a manner well known to those skilled in the art. The feed conveyor comprises a rigid conveyor tube that extends a relatively long distance within the poultry house and has a multiplicity of feeders 10 operatively connected to the conveyor tube at spaced intervals therealong. As is well known to those skilled in the art, the feed conveyor tube has a plurality of bottom-facing openings, one for each feeder 10, preferably spaced along the length of the feed conveyor tube so that feed conveyed by the feed conveyor may be delivered to each of the feeders 10 upon operation of the feed conveyor.

The feed conveyor tube is typically suspended from the ceiling or roof of the poultry house by means of a well-known winch and cable assembly (not shown) that may be selectively operated to raise or lower the conveyor tube and all of the feeders 10 connected thereto. In operation, the winch and cable assembly is adjusted so that the feeders 10 may rest on the floor of the poultry house in a winch-down condition. The winch may be operated to begin to lift the feeders 10 from the floor in a winch-up condition. The winch also may be operated to lift all of the feeders 10 well above the floor to allow for the ready cleanout of the poultry house and the addition of new bedding material. Once the new bedding is in place, the winch system is operated to lower the feeders onto the bedding. It will be understood by those skilled in the art that some poultry houses have a slatted floor that does not require the use of bedding material, in which case the feeders 10 of the present disclosure may rest directly on the slatted floor.

Referring now to the drawings, FIGS. 1-5 show a poultry feeder of the present disclosure illustrated generally by reference character 10. The feeder 10 includes a feed pan 12 and a grill 14. The feed pan 12 includes a pan ring 16 surrounding a pan floor 18 having a raised central cone 20 (which is shown to be generally domed at its peak). In the illustrated embodiment, the pan floor 18 is removable from the pan ring 16 as will be described below for cleaning purposes. In the illustrated embodiment, the central cone 20 of the pan floor 18 has a smaller cone 22 at the top of the center cone. The bottom pan ring 16 has a sloped side wall 24 extending upwardly from a ring opening 26. A lip 28 extends outwardly from the side wall 24 at the top of the wall. The lip 28 is preferably a circumferential lip, and thus extends completely around the side wall 24. If desired, the lip 28 need not be continuous, but could comprise a series of discrete lips.

The grill 14 has an upper grill ring 30, a lower rim 32 and a plurality (e.g., eight) spokes 34 extending between the upper grill ring 30 and the lower rim 32. Extending downward from the lower rim 32 is an annular grill wall 36 having an inner diameter that is slightly greater than the outer diameter of the lip 28 of the pan 12. The grill wall 36 includes upper and lower lips 38 and 40 which extend inwardly from the top and bottom of the grill wall 36, respectively.

As is known in the art, the feeder 10 can be selectively switched between a first condition (FIG. 4) in which the pan 12 and a grill 14 are in a low wall mode as well as be operated in a second condition (FIG. 5) in which can be operated in a high wall mode. As perhaps best seen in FIG. 3, the grill wall 36 is positioned on the pan 12 such that the lip 28 of the pan 12 is between the lips 38 and 40 of the grill wall 36. As seen by comparing FIGS. 4 and 5, the grill 14 and the pan 12 can thus move vertically relative to each other to alter the effective depth of the pan. The length of travel of the grill 14 and pan 12 relative to each other is limited by the height of the grill wall 36. As can be appreciated, the grill wall lips 38 and 40 act as stops to prevent the grill wall 36 from coming off the pan 12.

The feeder 10 further includes feed level skirt, as generally indicated at 50. Turning also now to FIGS. 6A-C, a lower portion of the feed level skirt 50 comprises a lower skirt 52 whose lower end is flared outwardly, a feed level tube 54 with one or more openings or flood windows 56 in the feed level tube 54 located above the lower skirt 52. An upper skirt 58 extends from the feed level tube 54 above the flood windows 56 and shields the flood windows 56. The feed level skirt 50 has an upper rim 59 that has a diameter which is smaller than the diameter of the feed level tube 54. A plurality of anti-scratch fins 60 are preferably equally angularly spaced around the lower skirt 52. These fins 60 inhibit or minimize the tendency of birds to scratch feed from the feeder 10. As shown in FIG. 1, these anti-scratch fins 60 are spaced between spokes 34 such that it discourages young birds from staying too long in the feeder 10 so as to allow other birds to feed and to prevent birds from sleeping in the feeder because of a lack of space. It will be appreciated that with the feed level skirt 50 in its operative position, as perhaps best shown in FIGS. 4 and 5, there is a space 62 between the upper surface of feed pan cone 20 and the lower skirt 52 for establishing a layer of feed on the feed cone 20 and a pile of feed in the bottom of pan 12.

Figure 7B:
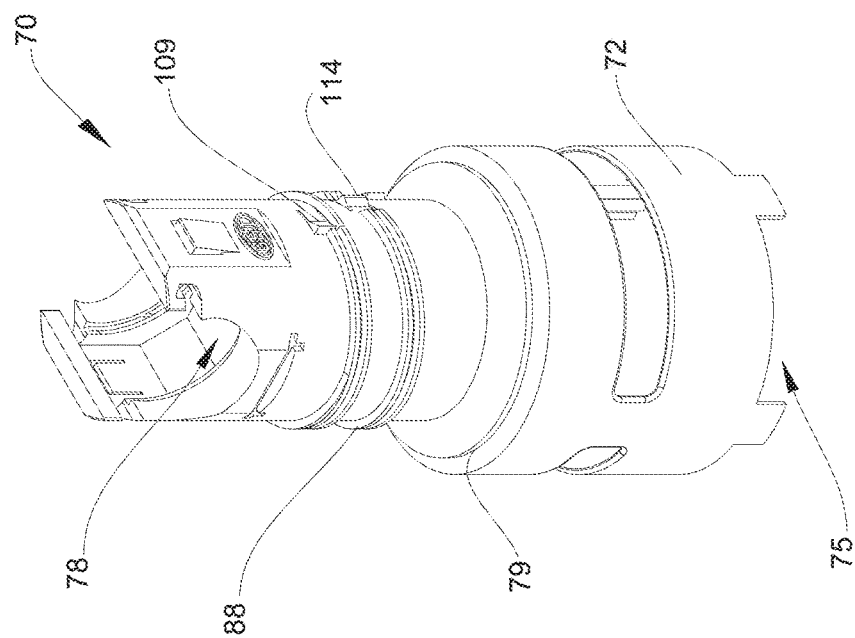
FIGS. 7A and 7B are perspective views of a drop tube of the feeder.
Figure 7A:
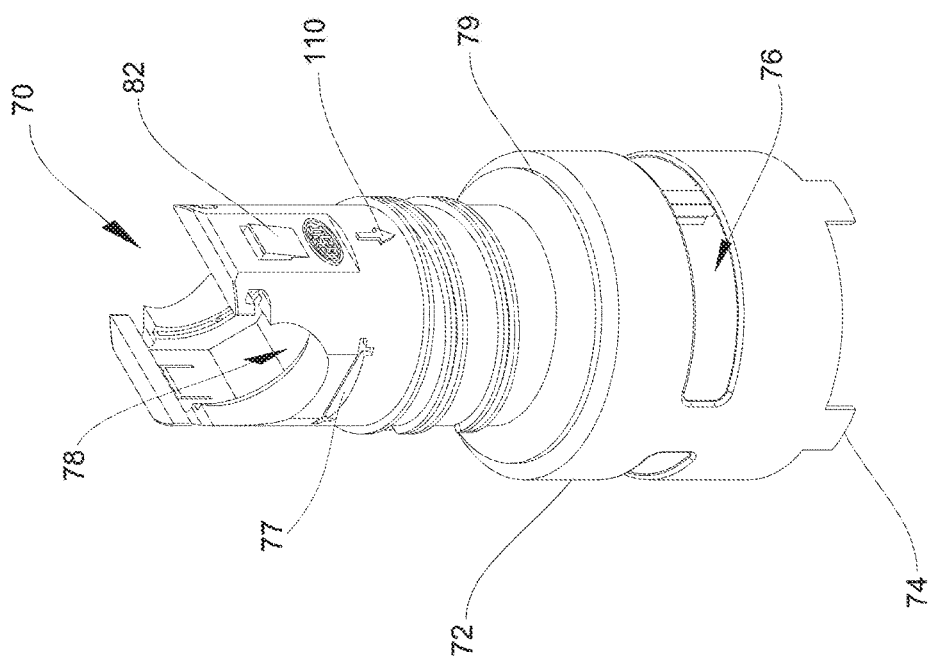

The feeder 10 further includes a drop tube, as generally indicated at 70. Turning also now to FIGS. 7A-B, the drop tube 70 includes a lower drop tube portion 72 having feet 74 on its bottom end that engage the upper surface of the feed pan cone 20 so as to positively establish a space 75 between the upwardly facing surface of the feed pan cone 20 and the bottom edge of the lower drop tube portion 72. The spaces 62, 75 between the feed pan cone 20 and the feed level skirt 50 and drop tube 70 align to prevent feed from being blocked. One or more (and preferably a plurality of) flood windows 76 are spaced around the lower drop tube portion 72. The drop tube 70 has an upper drop tube portion 77 which in the illustrated embodiment has a diameter smaller than that of the lower drop tube portion 72. The upper and lower drop tube portions 77, 72 are connected by a shoulder 79. The diameter of the lower drop tube portion 72 is slightly smaller than the diameter of the feed level tube 54 of the feed level skirt 50 such that the lower drop tube portion 72 nests within the feed level skirt 50 with the upper drop tube portion 77 extending through the upper rim 59. The feed level skirt 50 and drop tube 70 are configured for vertical movement relative each other with the upper rim 59 of the feed level skirt 50 interacting with the shoulder 79 to define one extreme of the vertical movement of the feed level skirt 50 relative to the drop tube 70 which is reached when the feeder is in the winch-up condition. In this winch-up condition, the windows 56 of the feed level tube 54 are out of alignment with the windows 76 in the lower drop tube portion 72. However, when the feeder 10 is in the winch-down condition with the pan 12 resting on floor, the feed level skirt 50 moves upward relative the drop tube 70, so the windows 56, 76 align such that feed may pass out of the drop tube 70 through the aligned windows 56, 76. Desirably, the windows 56 in the feed level tube 54 have a taller opening in the vertical direction (i.e., along the height of the feed level tube or direction of relative movement) than that of the windows 76 in the lower drop tube portion 72. Therefore, the height of the drop tube 70 can be changed relative the feed level skirt 50 while still having alignment between the windows 56, 76 in these different relative positions.

Figure 2:
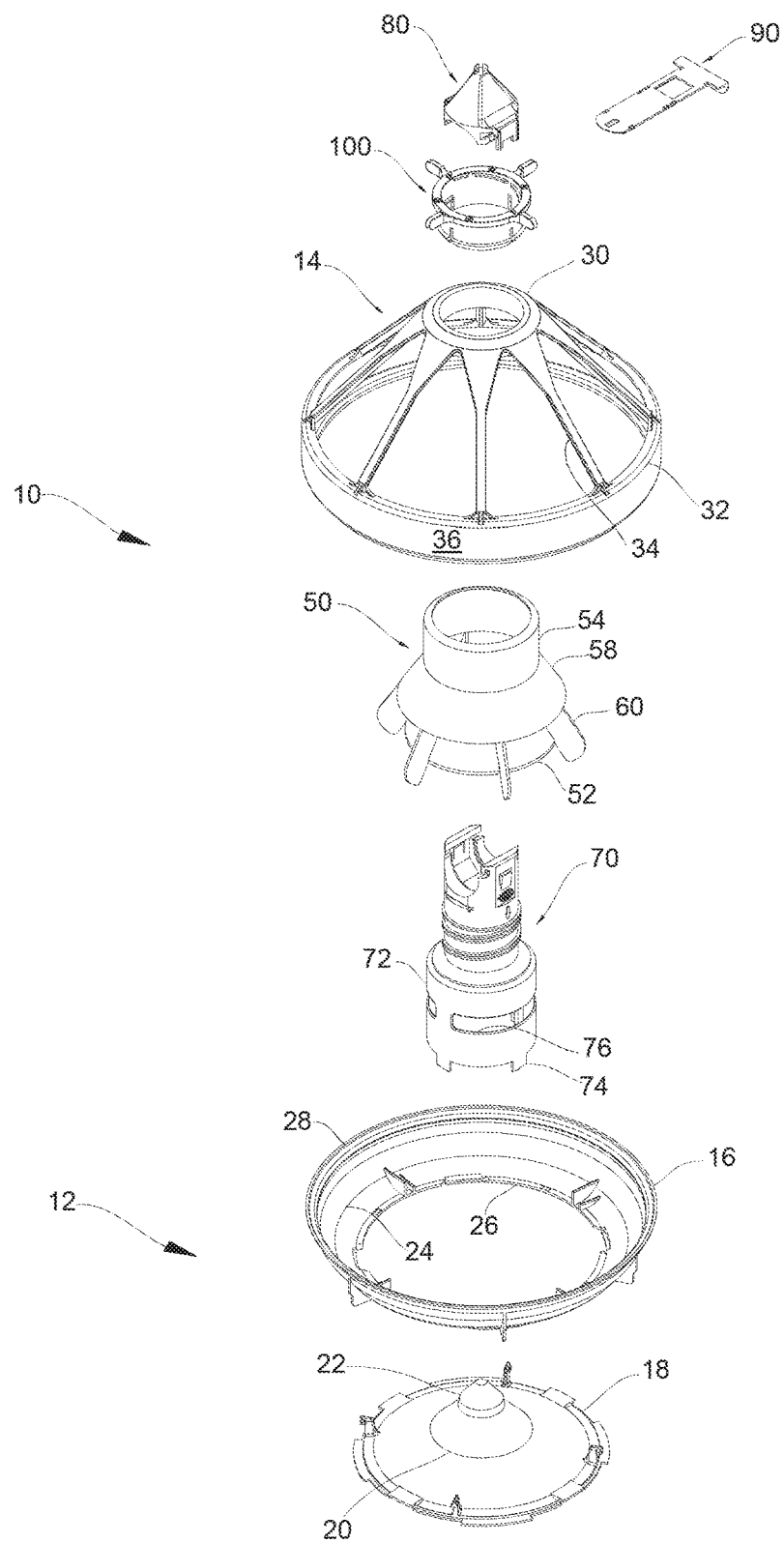
FIG. 2 is an exploded perspective view of the feeder.
Figure 4:
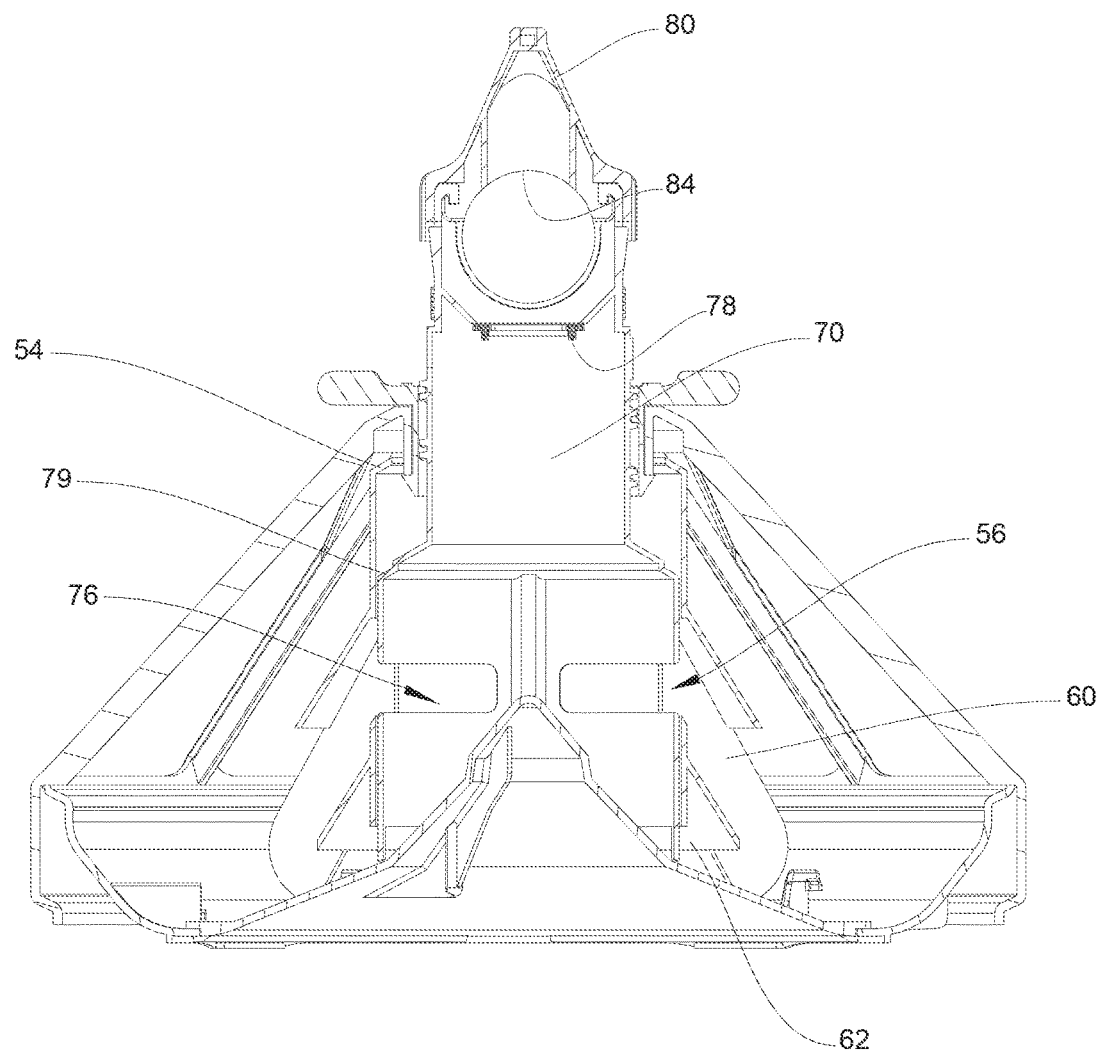
FIG. 4 is a cross section view of the feeder in a winch-down condition.
Figure 10:
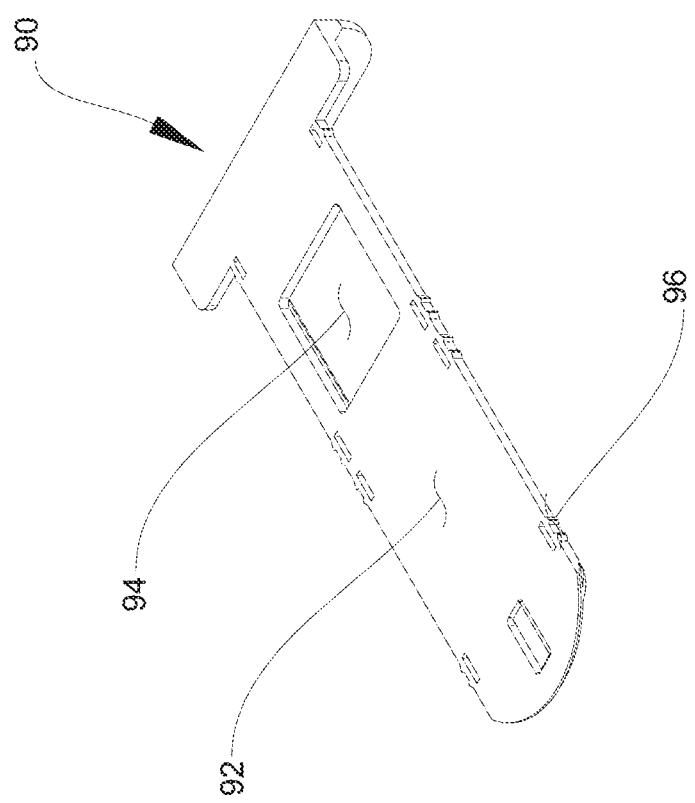
FIG. 10 is a perspective view of a shut-off slide for the feeder on an enlarged scale.

The upper drop tube portion 77 is shaped for receiving the bottom portion of the conveyor tube as would be understood by one skilled in the art and has an opening 78 to receive feed from an aligned opening in the conveyor tube. A top cap 80 (as best shown in FIGS. 2 and 10) is releasably secured (snap locked) to the upper end of the drop tube 70. The top cap 80 has an underside 84 (as best seen in FIG. 4) which is adapted to receive an upper portion of the feed conveyor tube. One skilled in the art will understand that the top cap 80 latches to the drop tube 70 with any suitable latching mechanism using sound engineering judgment such that the latching connection is able to bear the weight of the feeder 10 as the feeder is lifted off the floor and supported by the connection of the drop tube 70 and top cap 80 around the conveyor system of the poultry house. In the illustrated embodiment, the top cap 80 slides onto the upper drop tube portion 77 such that a stopper slot 81 in the top cap 80 aligns with a stopper 82 on the upper drop tube portion 77. Yet, when desired, the feeder 10 may be readily removed from the conveyor tube without the use of even simple hand tools.

To install a feeder 10 on a feed conveyor tube, at a location of a selected bottom facing outlet opening of the tube, a feeder 10 with top cap 80 removed is brought into engagement with the conveyor tube at the location of a selected opening and a top cap 80 is snapped into place on to the upper portion of the drop tube 70. It will be appreciated that the upper drop tube portion 72 and the top cap 80 are preferably sized so as to surround the conveyor tube to prevent undue leakage of feed, but so as to allow the feeder 10 to swing in a plane generally perpendicular to the horizontal axis of the feed conveyor tube such that if a bird bumps into the rim 32 of the feed pan, the feeder is not rigidly fixed relative to the conveyor tube and the feeder will rotate or swing on the feed conveyor tube. In this way, bruising of the breast of the bird is avoided which adversely affects the marketability of the bird. At the upper end of the top cap 80, an attachment 86 is provided for an electrified anti-roost wire. The drop tube 70 has external threads 88 on the outside of the upper drop tube 77.

The feeder 10 further includes a shut-off slide, as generally indicated at 90. Turning also now to FIG. 10, the shut-off slide 90 is provided in the upper portion of the drop tube 70 to selectively block the flow of feed into the upper drop tube portion 77 or to allow and to regulate the amount of feed to enter the upper drop tube portion from the conveyor system. As shown in FIG. 10, shut-off slide 90 has a solid portion 92, which when it is in registery with the opening 78 to drop tube 70, blocks the flow of feed from the conveyor tube into the feeder 10. The shut-off slide 90 further has at least one opening 94 for admitting feed from the feed conveyor to flow into the drop tube 70 when the opening 94 is in register with the opening 78 in the upper end of the drop tube 70. Alternatively, the shut-off slide 90 may have a plurality of openings therein of different sizes spaced along the shut-off slide 90 to regulate the flow of feed into the drop tube 70.

Desirably, the shut-off slide 90 is provided with stops 96 that latch the shut-off slide 90 relative to the drop tube 70 in different positions so as to fully block, partially open, or fully open opening 94 in register with the opening 78 in the drop tube 70 so as to have a high, medium and low supply of feed from the conveyor tube into the drop tube 72, as determined by how much of opening 94 in the shut-off slide 90 is in register with opening 78 so that the amount of feed discharged from the feed conveyor into the upper portion drop tube portion 77 may be selectively controlled or regulated. It will be appreciated that in some operating circumstances, it may be desirable for an operator to be able to block the flow of feed to certain of the feeders 10 in a poultry house. Thus, shut-off slide 90 provides an easy way for such feeders 10 to be de-activated without having to remove the feeder from the feed conveyor system. While the opening 94 is shown in FIG. 10 to be a rectangular opening, it will be appreciated that it could be of other shapes, such as circular. It will also be appreciated that by merely looking at the position of the shut-off slide 90, the amount that the valve extends from the drop tube 70, a poultry house attendant can verify whether a feeder 10 is fully blocked or whether a predetermined flow of feed from the feed conveyor is admitted into the drop tube. In this manner feed may be readily distributed to various feeders 10 along the feed conveyor in a prescribed manner. In turn, this feature minimizes feed wastage.

Figure 3:
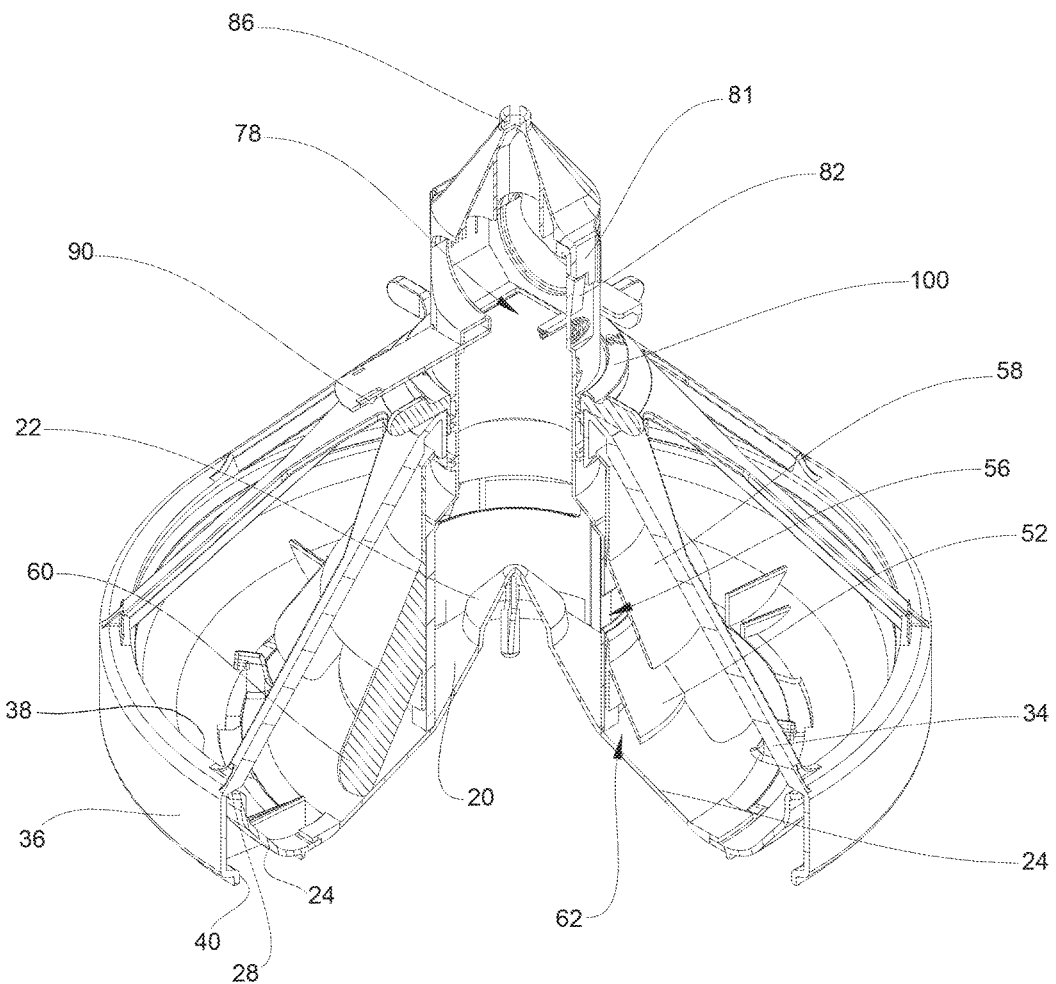
FIG. 3 is a view similar to FIG. 1 with ¼ of the feeder shown in cross section to illustrate the relationship of the various components of the feeder.
Figure 8B:
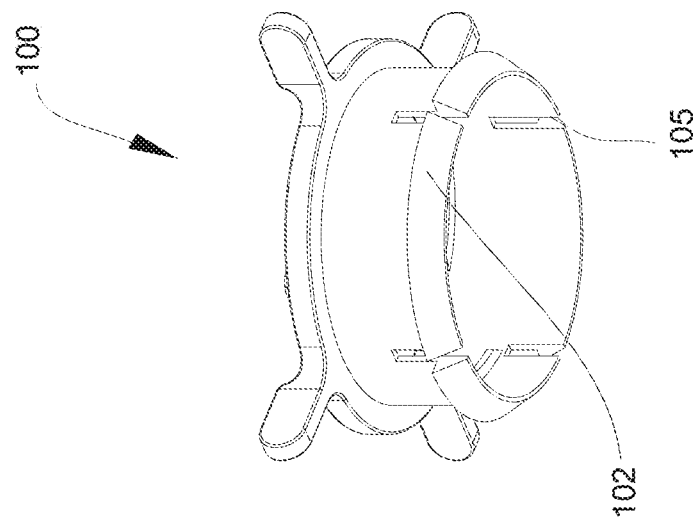
FIGS. 8A and 8B are perspective views of an adjustment ring for the feeder on an enlarged scale.
Figure 8A:
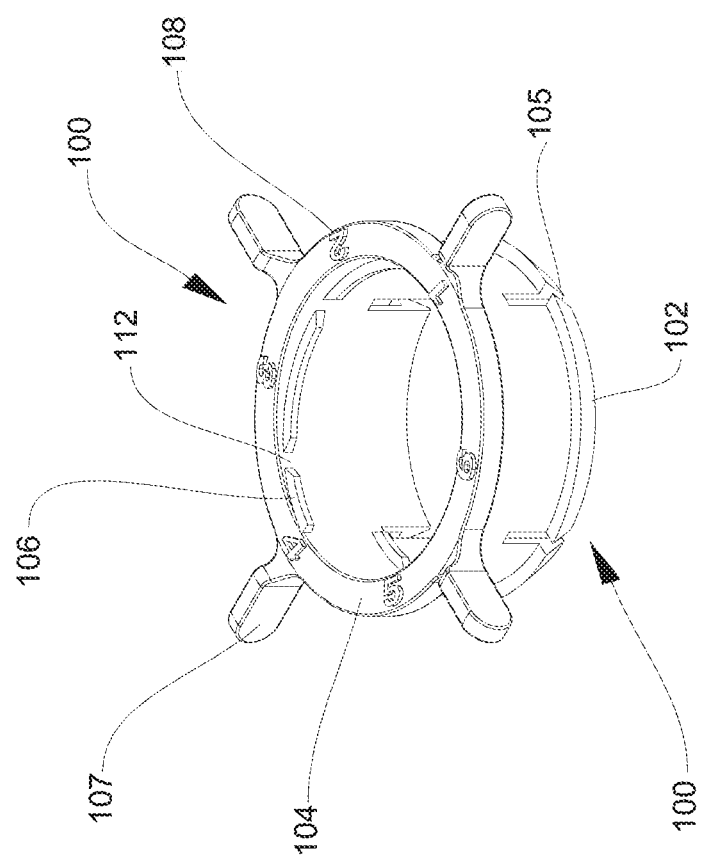
Figure 9:
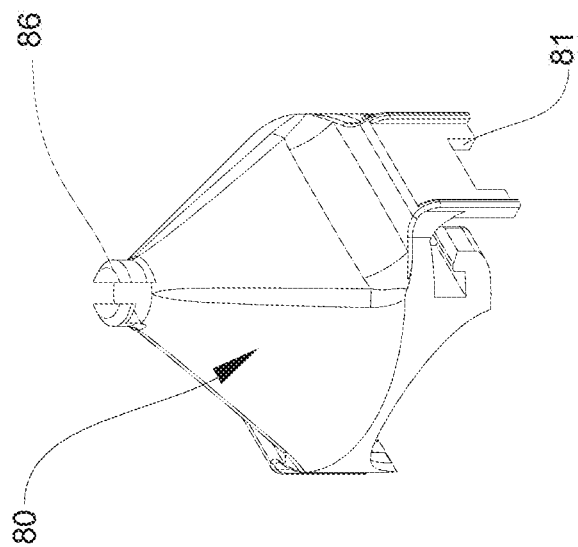
FIG. 9 is a perspective view of a top cap for the feeder on an enlarged scale.

The feeder 10 further includes an adjustment ring, as generally indicated at 100. Turning also now to FIGS. 8A-B, the adjustment ring 100 has a snap hook 102 extending down from an upper surface 104 of the adjustment ring 100. The adjustment ring 100 is inserted into the upper grill ring 30 of the grill 14 by snap fit. In the illustrated embodiment, the snap hook has four slots 105 allowing for compression of the adjustment ring so it can pass through the upper grill ring, then the snap hook 102 will snap and hook at bottom of the upper grill ring 30. Internal threads 106 are provided on the inside surface of the adjustment ring 100. As shown in FIG. 3, the drop tube 70 is received within the adjustment ring 100, which is received within upper grill ring 30 of the grill 14. It will be appreciated that these members may move both axially and rotatably relative to one another for purposes as will appear.

With the adjustment ring 100 inserted into the grill 14, the drop tube 70 together with the feed level skirt 50 are inserted from the bottom of the grill 14 through the adjustment ring 100. The internal threads 106 on the adjustment ring 100 threadably engage the threads 88 on the drop tube 70. As best seen in FIG. 7B, upper and lower stops 109 prevent the threads 88 of drop tube 70 from becoming threadably disengaged from the threads 106 of the adjustment ring 100.

A number of tabs 107 are provided around the circumference of the adjustment ring 100. As indicated at 108 shown in FIG. 8A, indicia (e.g., numbers "1", "2", etc.) may be provided on the upper surface 104 of the adjustment ring 100, preferably at substantially equal angular intervals around the adjustment ring, and an indicator arrow 110 (See FIG. 7A) may be provided on the upper drop tube portion 77 of the drop tube 70 such that upon rotation of the adjustment ring 100 relative to the drop tube 70 such that the arrow 110 points to a desired indicia 108 thus indicating that a pre-selected feed level supply position has been selected. As shown in the drawings, six indicia 108 are provided on the upper surface 104 of the adjustment ring 100 where the indicia are spaced around the adjustment ring 100 at substantially equal angular intervals of about 60° such that six different feed level supply positions may be selected. More specifically, by rotating the adjustment ring 100 relative to the drop tube 70, the vertical position of the drop tube 70 relative to the feed level skirt 50 and the pan 12 will change. The amount of change is dependent on the magnitude of the rotation of the adjustment ring 100 and the pitch angle of the threads 106, 88 on the adjustment ring 100 and the drop tube 70. Thus, rotating the adjustment ring 100 will both change the magnitude of the space 75 between the bottom of the drop tube 70 and the upper surface of the pan cone 20 and will change the height of the windows 76 in the drop tube 70. Thus, the amount of feed that can be introduced into the feed pan 12 will be increased or decreased (depending on which direction the adjustment ring 100 is rotated) where No. 1 of the indicia 108 on the upper face 104 of adjustment ring 100 denotes the least feed supply and higher indicia numbers indicate increase of feed supply amount. In one embodiment, there are a number of v-grooves 112 in the threads 106 of the adjustment ring and the threads 88 of the drop tube 70 have a snap bump 114. The v-grooves 112 are positioned around the adjustment ring 70 with one v-groove for each of the indicia 108 such that the snap bump 114 is received in one of the v-grooves when the adjustment ring 70 is in one of the pre-selected feed level positions to hold the adjustment ring 100 in the selected feed level position.

Preferably, the main components for feeder 10, including feed pan 12, grill 14, feed level skirt 50, drop tube 70, top cap 80 and adjustment ring 100 are injection molded (or otherwise formed) of a suitable synthetic plastic material, such as a polypropylene resin. Thus, it will be understood that certain parts of the feeder 10 may be resiliently flexible for purposes as will be herein described.

Periodically, at either the discretion of an operator or at pre-programmed times, the feed conveyor system may be actuated to deliver additional amounts of fresh feed to each of the feeders 10. It will be appreciated that as feed flows from the drop tube 70, a pile of feed will build up until the feed reaches a certain depth in the feed pan 12 as established by the size and shape of the feed pan 12, the height of the space 62 between the upper surface of the feed pan cone 20 and the underside of feed level skirt 50 or the height of the windows 76 in the drop tube 70, and the angle of repose of the feed pan 12 as will be described in more detail below. When the pile of feed blocks the flow of feed from inside the drop tube 70, the further flow of feed is blocked and no additional amount of feed will flow through the drop tube 70 and into the feed pan 12 even though feed may be present in the drop tube 70. In this manner, the amount of feed deposited in the feeder 10 is self-limiting, even when the feed conveyor continues to operate so as to deliver feed to other feeders 10 along the conveyor. In other words, the feeders 10 of the present disclosure will not be overfilled.

It will be understood that upon operation of the conveyor system of the poultry house and with shut-off slide 90 in an open position, a flow path is established for feed from the conveyor tube to flow into drop tube 70. As set forth above, the feeder 10 may be operated in a winch-down condition where the feeder 10 rests on the floor of the poultry house. Alternately, the feeder 10 may be operated in a winch-up condition in which the feeder 10 is lifted off the floor such that weight of the feeder 10 is supported by the connection of the drop tube 70 and top cap 80 around the conveyor system of the poultry house.

In the winch-down or flood feed condition, there are two paths for the feed to enter the pan 12. The first path is a flood path through the windows 76 in lower drop tube portion 72 of the drop tube 70 which are aligned with the windows 56 in the feed level skirt 50. It will be understood that the windows 56, 76 will always be aligned and feed will flow from within the drop tube 70 when in the winch-down condition. The relative vertical position of feed level skirt 50 and the pan 12 will be constant in the winch-down condition as the anti-scratch fins 60 on the feed level skirt 50 are always in contact with the floor 18 of the pan 12 so the windows 56 will remain in in a constant position. The windows 76 in the drop tube 70 are configured to always align with the larger windows 56 in the feed level skirt 50 in the winch-down condition so as to flood the feeder 10 with feed. However, rotating the drop tube 70 to a higher level will raise the position of the drop tube 70 relative to the pan 12. Thus the windows 76 will be in a higher position relative the pan 12 thereby allowing a higher level of food in the pan.

The second path is through the gap formed by the aligned spaces 62, 75 between the feed pan cone 20 and the feed level skirt 50 and drop tube 70. Similarly, since the feed level skirt 50 rests on the pan 12 in all rotational positions, there is no difference in this second path when the feeder 10 is set to level no. 6 verses when it is set to level no. 1. The feed will flow through the interior of the upper and lower drop tube portions 77, 72 and will flow out of the bottom of the drop tube 70 through the space 75 at the bottom of the drop tube 70 and the space 62 at the bottom of the feed level skirt 50 and the upper surface of the cone 20, as shown in FIG. 4, and will form a layer of feed on the upper surface of cone 20 and in the feed pan 12.

Figure 5:
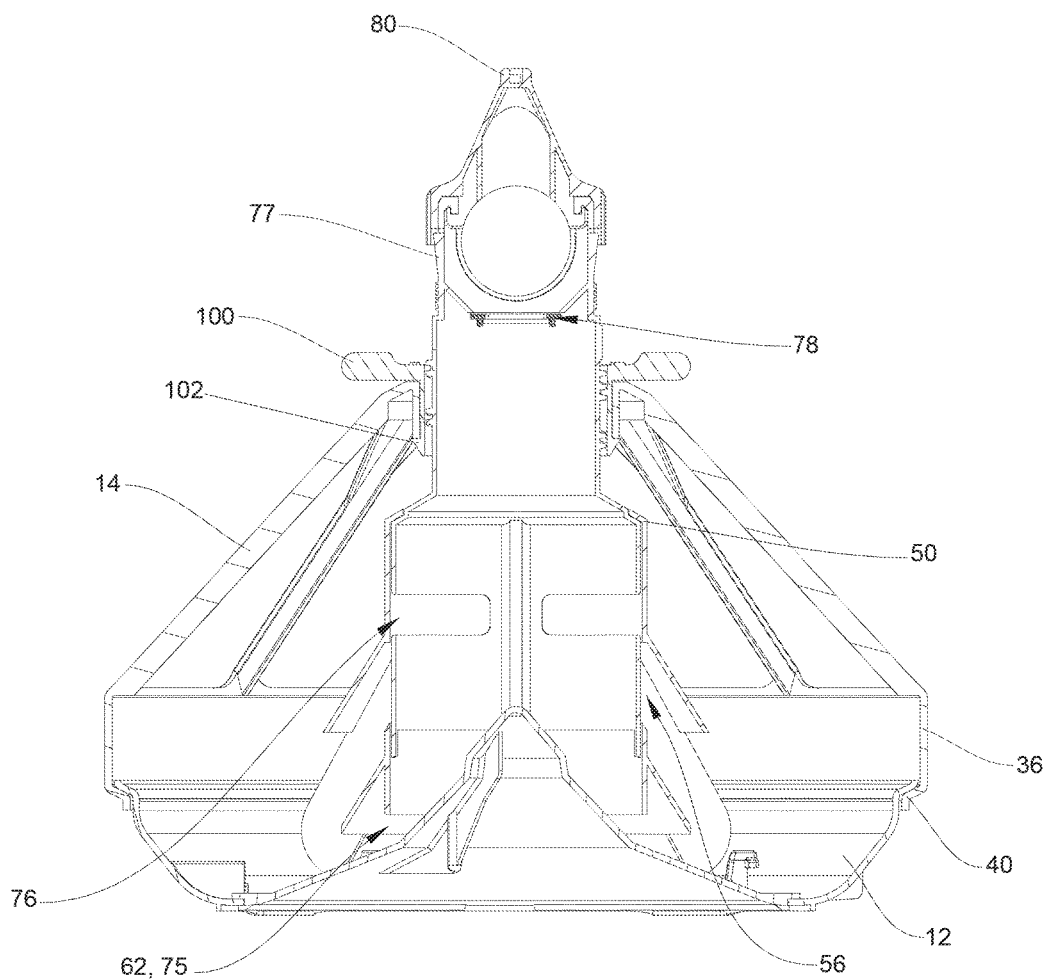
FIG. 5 is a cross section view of the feeder in a winch-up condition.

As the birds grow in size, the conveyor tube along with the feeders 10 connected to the conveyor tube are raised, as for example by the above-described winch and cable assembly, and the feed pans 12 move away from the floor of the poultry house to the winch-up condition as shown in FIG. 5. It will be appreciated that once the feeder 10 is suspended from the conveyor tube in the winch-up condition, the flood windows 56, 76 are always closed and no feed passes through the windows. In the winch-up condition, the pan 12 moves downward relative the grill 14 into the deep pan position. With the pan 12 in the deep-pan position, the feed level skirt 50 moves downward relative to the drop tube 70 until the top rim 59 of the feed level skirt 50 rests on the shoulder 79 of the drop tube 70. In this position, the feed level tube 54 blocks the windows 76 in the lower drop tube portion 72.

Thus, in the winch-up condition, the only feed that may flow into the feed pan 12 is through the space 62 between the bottom of the feed level skirt 50 and the upper face of pan cone 20. It will be further appreciated that in this manner, the feed level may be set at any one of the predetermined feed levels corresponding to the number indicia 108 on the adjustment ring 100 or on any desired intermediate position thereby to vary the amount of flood feed in the feeder 10. As the adjustment ring 100 is rotated, the vertical position of the drop tube 70 changes. Since in this condition the feed level skirt 50 moves upward with the drop tube 70, the size of the gap formed by the space 62 between the bottom of the feed level skirt 50 and the upper face of pan cone 20 changes with the position of the adjustment ring 100. As described above, increasing the size of space 62 permits a higher level of feed to accumulate in the pan 12.

Figure 11:
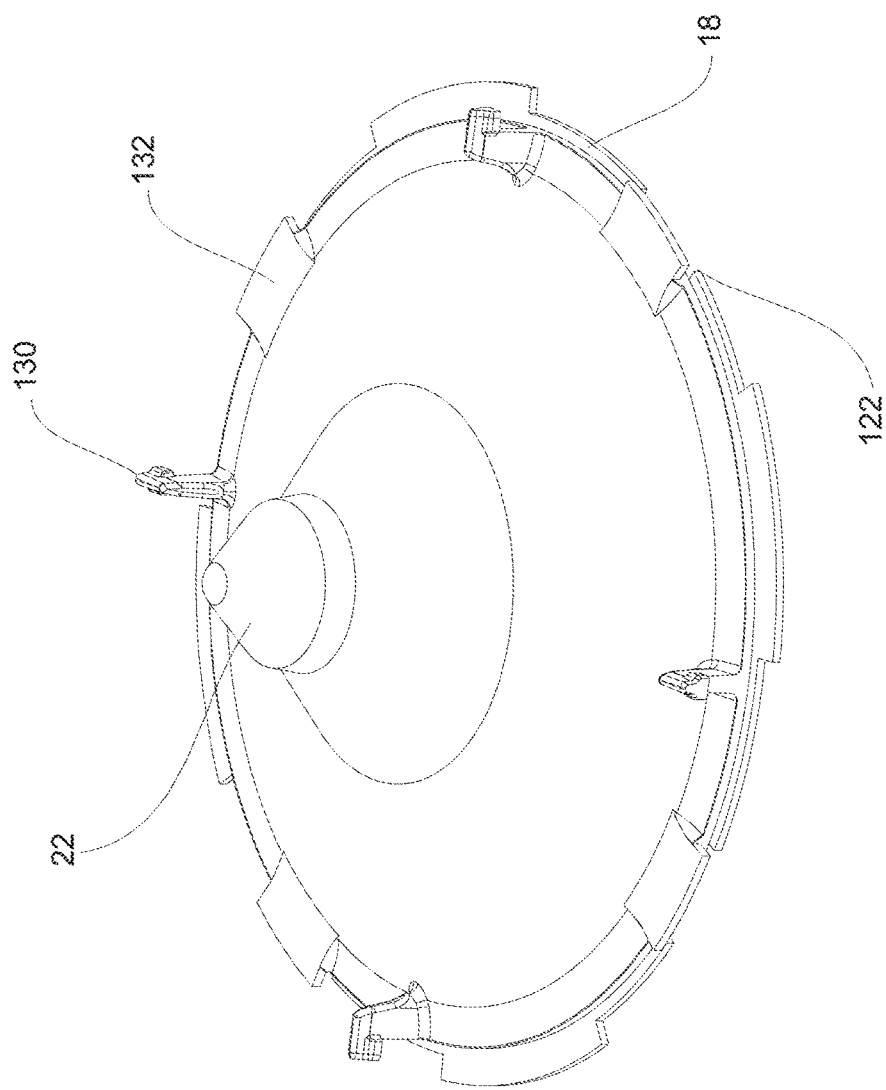
FIG. 11 is a perspective view of a pan floor for the feeder.
Figure 12:
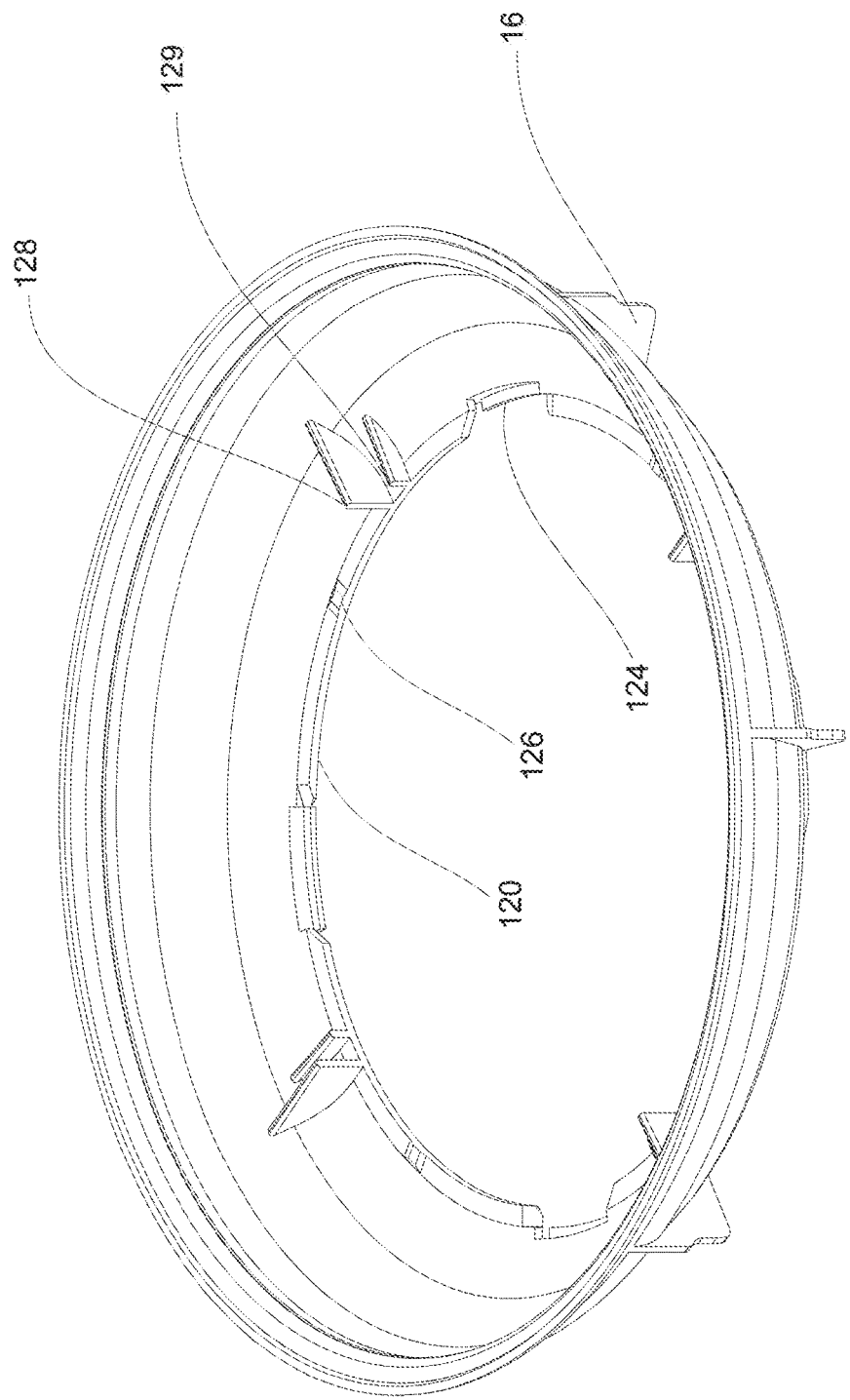
FIG. 12 is a perspective view of a pan ring for the feeder.

Turning now to FIGS. 11 and 12, the pan floor 18 is removable from the pan ring 16 of the feed pan 12. The pan ring 16 has an inner opening formed by an inner edge portion 120 that interacts with and releaseably captures an outer edge portion 122 of the pan floor 18 so that the pan floor may be removed as necessary for cleaning or other purposes. In the illustrated embodiment, the pan ring 16 has at least one slot 124, bump 126 and stopper 128 formed therein and the pan floor 16 has at least one pillar hook 130 and one tab holder 132 configured to interact with the slot 124, bump 126 and stopper 128. In the illustrated embodiment, the feed pan 12 has four sets of interacting means used to hold the pan floor 18 in the pan ring 16. However, more or fewer interacting means may be used.

To assemble the feed pan 12, the pan floor 16 is inserted into the opening in the pan ring 16 such that the pillar hook 130 is inserted through the corresponding slot 124 on bottom pan ring 16. Using tabs on the underside of the pan floor 18, the pan floor 18 is rotated in a first direction, in the illustrated embodiment counter clockwise, until the pillar hook 130 contacts the stopper 128 on the pan ring 16. The user then pushes up on the pan floor 18 such that tab holder 132 passes through the slot 124 in the pan ring 18 until the gap closes. The pan floor 18 is then turned in the opposite direction, in the illustrated embodiment clockwise, until the pan ring 16 clears the bump 126 by friction and enters the designated space gap of the pan floor 18. The bump 124 thereafter acts as a stopper. The pan floor 18 is then locked by ensuring that the tab holder 132 is positioned between the stopper 128 and bump 126. However, one skilled in the art will understand that other interacting means may be used to secure the pan floor 16 to the pan ring 18.

For cleaning purpose after each flock, the pan floor 18 will be turned counter clockwise until the pillar 130 touches the stopper 128. The user then pulls the pan floor downwards until the pillar 130 rests on the inner edge portion 120 of the pan ring 16 whereby the pillar 130 sits in between stopper 128 and a short stopper 129 of the pan ring 16. The short stopper 129 prevents the pan floor 18 from rotating around during cleaning (i.e. with high pressure water)

While the feeder of the present disclosure has been described to be a broiler pan feeder intended for use in raising broiler chickens, it will be apparent to those skilled in the art that the feeder described herein may be used with all types of poultry, including other livestock, such as ducks and turkeys. As various changes could be made in the above constructions without departing from the broad scope of the invention, it is intended that all matter contained in the above description or shown in the accompanying drawings shall be interpreted as illustrative and not in a limiting sense.

The invention claimed is:

1. A poultry feeder operable in a winch-up condition where the feeder is positioned off of a floor of the poultry house and in a winch-down condition in which the feeder is position resting on the floor of the poultry house, the poultry feeder comprising:

a feed pan having a pan floor and a side wall;

a grill having an annular wall which surrounds the pan side wall and is movable relative to the pan side wall between a first low-wall position in the winch-down condition in which the feeder has an effective lower wall height and a second high-wall position in the winch-up condition in which the feeder has an effective higher wall height, the grill further including a plurality of spokes extending from a top of the annular wall and an upper ring connecting upper ends of said spokes;

a feed level skirt comprising a plurality of fins, a lower skirt and a feed level tube with at least one flood window in the feed level tube located above the lower skirt, and an upper rim having a diameter which is smaller than the diameter of the feed level tube, wherein the fins contact the feed pan to position the feed level skirt in its operative position with a space formed between the feed pan and the lower skirt;

a drop tube comprising a lower drop tube portion, an upper drop tube portion having a diameter smaller than that of the lower drop tube portion, and a shoulder connecting the upper and lower drop tube portions, wherein the lower drop tube portion has at least one flood window formed therein and feet on its bottom end that engage the feed pan so as to establish a space between the feed pan and the lower drop tube portion, the lower drop tube portion nesting within the feed level skirt with the upper drop tube portion extending through the upper rim, wherein the spaces between the feed pan and the feed lower skirt and lower drop tube portion align, wherein the feed level skirt and drop tube are configured for vertical movement relative each other with the upper rim of the feed level skirt interacting with the shoulder to define one extreme of the vertical movement of the feed level skirt relative to the drop tube which is reached when the feeder is in the winch-up condition, wherein in the winch-up condition, the at least one window of the feed level tube is out of alignment with the at least one window in the lower drop tube portion and wherein, when the feeder is in the winch-down condition, the feed level skirt moves upward relative the drop tube, so the windows align such that feed may pass out of the drop tube through the aligned windows; and an adjustment ring comprising an upper surface and a snap hook extending down from the upper surface, the snap hook being insertable into the upper grill ring, the adjustment ring having internal threads on an inside surface thereof, wherein the drop tube is received within the adjustment ring such that the internal threads on the adjustment ring threadably engage the threads on the drop tube so that by rotating the adjustment ring, the vertical position of the drop tube relative to the feed level skirt and the pan is changed to change a magnitude of the space between the drop tube and the pan and change a height of the at least one window in the drop tube.

2. The poultry feeder of claim 1 wherein the poultry feeder defines a first path and a second path for feed to enter the pan, the first path comprising a flood path through the aligned windows in lower drop tube portion and in the feed level skirt, and the second path comprising a path through the aligned spaces between the feed pan and the lower skirt of the feed level skirt and lower tube portion of the drop tube.

3. The poultry feeder of claim 2 wherein the windows are always aligned when in the winch-down condition such that there are always two flow paths in the winch-down condition.

4. The poultry feeder of claim 3 wherein the relative vertical position of feed level skirt and the pan is constant in the winch-down condition as the fins on the feed level skirt are always in contact with the pan.

5. The poultry feeder of claim 4 wherein the at least one window in the feed level skirt is larger than the at least one window in the drop tube such that the at least one window in the drop tube is configured to always align with the at least one window in the feed level skirt in the winch-down condition, but rotating the drop tube to a higher level will raise the position of the drop tube relative to the pan such that the at least one window in the drop tube to a higher position relative the pan thereby allowing a higher level of food in the pan.

6. The poultry feeder of claim 2 wherein the second path is constant in the winch-down condition as the feed level skirt rests on the pan in all rotational positions.

7. The poultry feeder of claim 2 wherein in the winch-up condition, the windows are out of alignment blocking the first flow path such that feed only flows through the second flow path.

8. The poultry feeder of claim 7 wherein in the winch-up condition, the pan moves downward relative the grill into the high-wall pan position such that the feed level skirt moves downward relative to the drop tube until the top rim of the feed level skirt rests on the shoulder of the drop tube where the feed level tube blocks the at least one window in the lower drop tube portion.

9. The poultry feeder of claim 7 wherein in the winch-up condition, as the adjustment ring is rotated, the vertical position of the drop tube and feed level skirt changes to change the size of the space between the feed level skirt and the pan.

10. The poultry feeder of claim 1 wherein the at least one window in the feed level tube has a taller opening in the vertical direction than that of the at least one window in the lower drop tube portion such that the height of the drop tube can be changed relative the feed level skirt while still having alignment between the windows in different relative positions.

11. The poultry feeder of claim 1 wherein upper and lower stops prevent the threads of the drop tube from becoming threadably disengaged from the threads of the adjustment ring.

12. The poultry feeder of claim 1 wherein indicia are provided at angular intervals around the adjustment ring and an indicator arrow is provided on the upper drop tube portion of the drop tube such that upon rotation of the adjustment ring relative to the drop tube, the arrow points to the indicia indicating a feed level supply position.

13. The poultry feeder of claim 12 further comprising a plurality of v-grooves in the threads of the adjustment ring and a snap bump in the threads of the drop tube, wherein the v-grooves are positioned around the adjustment ring with one v-groove for each of the indicia such that the snap bump is received in one of the v-grooves when the adjustment ring is in one of the pre-selected feed level positions to hold the adjustment ring in the selected feed level position.

14. The poultry feeder of claim 1 wherein the pan floor is removable from a pan ring of the feed pan.

15. The poultry feeder of claim 14 wherein the pan ring has an inner opening formed by an inner edge portion that interacts with and releaseably captures an outer edge portion of the pan floor.

16. The poultry feeder of claim 15 wherein the pan ring has at least one slot, at least one bump and at least one stopper formed therein and the pan floor has at least one pillar hook and at least one tab holder configured to interact with the at least one slot, bump and stopper.

17. The poultry feeder of claim 16 the pan floor is inserted into the opening in the pan ring such that the pillar hook is inserted through the corresponding slot on bottom pan ring and when the pan floor is rotated in a first direction, the pillar hook contacts the stopper on the pan ring and the tab holder passes through the slot in the pan ring.

* * * * *